United States Patent
Poorrezaei

(10) Patent No.: US 10,397,821 B2
(45) Date of Patent: Aug. 27, 2019

(54) REDUCED LATENCY OPERATING MODES FOR WIRELESS MESH NETWORKS

(71) Applicant: Silver Spring Networks, Inc., San Jose, CA (US)

(72) Inventor: Kamal Poorrezaei, San Jose, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 18 days.

(21) Appl. No.: 15/452,597

(22) Filed: Mar. 7, 2017

(65) Prior Publication Data
US 2018/0262940 A1 Sep. 13, 2018

(51) Int. Cl.
*H04W 28/02* (2009.01)
*H04W 52/02* (2009.01)
*H04W 84/18* (2009.01)

(52) U.S. Cl.
CPC ..... *H04W 28/0221* (2013.01); *H04W 28/021* (2013.01); *H04W 52/0222* (2013.01); *H04W 84/18* (2013.01); *Y02D 70/00* (2018.01); *Y02D 70/1224* (2018.01); *Y02D 70/20* (2018.01); *Y02D 70/22* (2018.01)

(58) Field of Classification Search
CPC ........... H04W 28/0221; H04W 28/021; H04W 52/0222; H04W 84/18
See application file for complete search history.

(56) References Cited

U.S. PATENT DOCUMENTS

| 2006/0029061 A1 | 2/2006 | Pister et al. |
| 2008/0165761 A1 | 7/2008 | Goppner et al. |
| 2009/0154481 A1 | 6/2009 | Han et al. |
| 2010/0296493 A1 | 11/2010 | Lee et al. |
| 2011/0268139 A1 | 11/2011 | Caracas et al. |
| 2012/0147746 A1 | 6/2012 | Shaffer et al. |

(Continued)

FOREIGN PATENT DOCUMENTS

EP 1 783 966 A2 5/2007

OTHER PUBLICATIONS

International Search Report for application No. PCT/US2018/021116 dated May 16, 2018.

*Primary Examiner* — Jae Y Lee
(74) *Attorney, Agent, or Firm* — Artegis Law Group, LLP

(57) ABSTRACT

A wireless mesh network includes a mesh of continuously-powered devices (CPDs) and a mesh of battery-powered devices (BPDs). The BPDs are organized into hop layers based on hopping distance to the mesh of CPDs. In a medium latency communication mode, a given BPD receives data during a receive window that is scheduled to occur within either the first half of a communication window or the second half of the communication window, depending on the parity of the hop layer where the BPD resides. With this approach, a data packet can traverse one hop of the BPD mesh per communication window. In a low-latency communication mode, a given BPD receives and transmits data according to an alternating pattern that depends on the parity of the hop layer where the node resides. With this technique, a data packet can traverse multiple hops of the BPD mesh within a single communication window. These techniques also are applicable to CPDs and other types of nodes as well.

20 Claims, 12 Drawing Sheets

(56) References Cited

U.S. PATENT DOCUMENTS

2012/0163177 A1\* 6/2012 Vaswani ................. H04L 45/00
370/236
2015/0109981 A1\* 4/2015 Patil ................... H04L 67/1078
370/311
2018/0091407 A1\* 3/2018 Tervonen ................. H04J 3/06

\* cited by examiner

REDUCED LATENCY OPERATING MODES FOR WIRELESS MESH NETWORKS

BACKGROUND OF THE INVENTION

Field of the Invention

Embodiments of the present invention relate generally to wireless network communications and, more specifically, to reduced latency operating modes for wireless mesh networks.

Description of the Related Art

A conventional wireless mesh network includes a plurality of nodes configured to communicate with one another. In certain types of heterogeneous wireless mesh networks, both continuously-powered nodes (CPDs) and battery-powered nodes (BPDs) reside within the mesh network and communicate with one another.

In many instances, CPDs are coupled to a power grid and have continuous access to power (except during power outages). CPDs typically reside in a subdomain of the overarching mesh network referred to as the "CPD mesh." BPDs, on the other hand, are battery-powered and therefore have only a finite supply of power. BPDs reside in a different subdomain of the overarching mesh network referred to as the "BPD mesh." In operation, the CPDs and BPDs may implement substantially the same communication protocol. In such cases, the nodes within one subdomain of the wireless network communicate in a manner that is consistent with how nodes in the other subdomain of the wireless network communicate.

When CPDs are coupled to the power grid, the CPDs can be configured to remain powered on for long intervals of time. During those intervals, a given CPD may continuously perform transmit and receive operations. Conversely, because BPDs have only a limited supply of battery power, the BPDs are usually configured to remain powered off for long intervals of time. For example, a given BPD may power on during a scheduled communication window, perform transmit and/or receive operations, and then return to a powered off state until a subsequent communication window occurs. In practice, a BPD mesh may remain powered off 97% percent of the time in order to conserve power.

During configuration of a conventional BPD mesh, each BPD randomly selects a receive interval within the scheduled communication window and then broadcasts when that receive interval is scheduled to neighboring BPDs. During normal subsequent operations, when a given BPD needs to transmit data packets to a neighboring BPD, the BPD powers on during the receive interval associated with the neighboring BPD and then transmits data packets to that neighboring BPD. When configured in such a manner, each BPD may act as a relay in order to receive data packets during the scheduled receive interval and then re-transmit those data packets during the receive intervals associated with neighboring nodes.

One drawback to the above approach is that, under some circumstances, BPDs may not be able to quickly re-transmit received data packets to their respective neighboring BPDs. For example, suppose the receive interval of a first node occurs immediately after the end of the receive interval of a second node. If the first node needs to transmit a data packet to the second node in order to propagate the data packet across the mesh network, then the first node must wait until the subsequent communication window for the second node to power on. When communication windows are separated by long periods of time, any given node may be required to wait an equally long period of time before being able to continue propagating a given data packet. These long wait times can significantly increase the overall latency of a wireless mesh network.

Furthermore, even under favorable circumstances where each BPD is capable of receiving and then immediately re-transmitting a data packet within one communication window, the overall network latencies may still be excessive for certain applications. For example, suppose a wireless mesh network is configured as a sensor array, where each BPD gathers real-time sensor data and then transmits that sensor data across the wireless mesh network to the CPD mesh. Each data packet still requires one full communication window in order to traverse one hop across the network. Accordingly, if there are many hops to traverse across the wireless mesh network, then the sensor data mentioned above or any other data transmitted across the network may become "stale" by the time the data arrives at the CPD mesh.

As the foregoing illustrates, what is needed in the art are more effective techniques for transmitting data packets across a wireless mesh network.

SUMMARY OF THE INVENTION

One embodiment of the present invention sets forth a computer-implemented method for propagating data packets across a wireless mesh network, including configuring a first node to receive data during a first sub-interval within a first communication window, wherein the first node resides within a first hop layer of the wireless mesh network, configuring a second node to receive data during a second sub-interval within the first communication window, wherein the second node resides within a second hop layer of the wireless mesh network, and causing the first node to receive a data packet during the first sub-interval and then transmit the data packet to the second node during the second sub-interval to propagate the data packet from the first hop layer to the second hop layer during the first communication window.

At least one advantage of the technique described herein is that a data packet can traverse one or more hops across the wireless mesh network per communication window.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
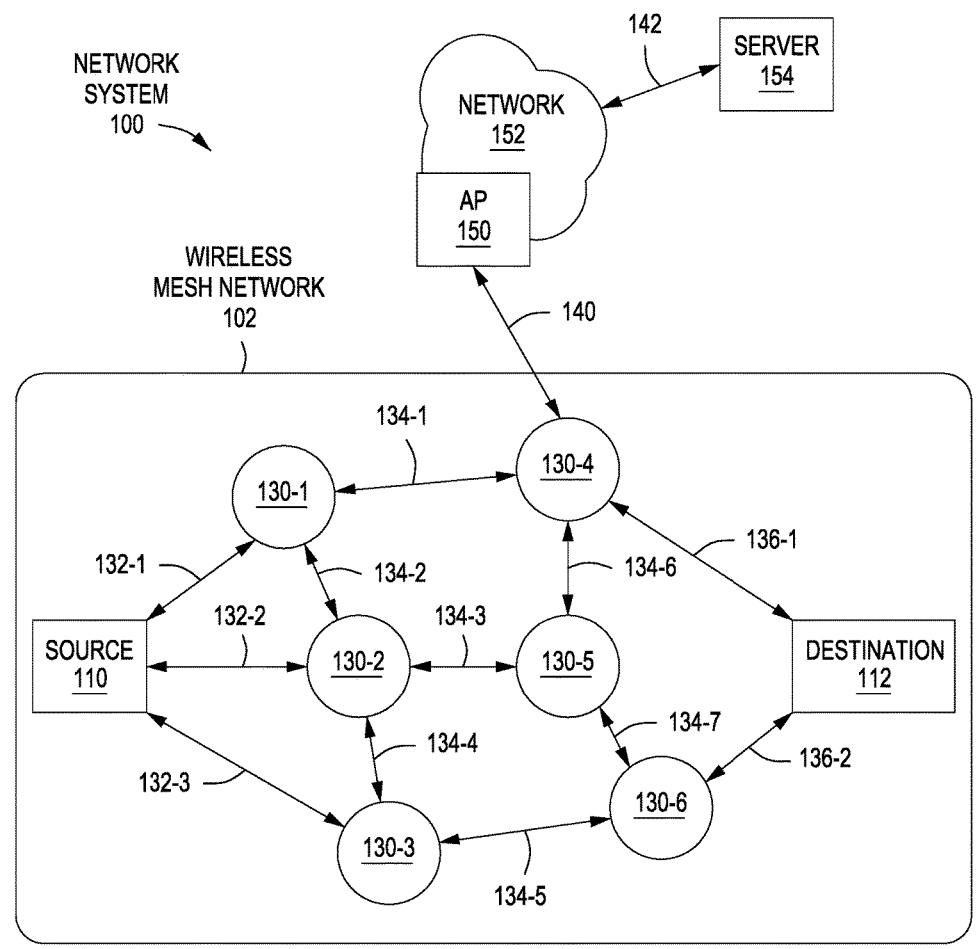
FIG. 1 illustrates a network system configured to implement one or more aspects of the present invention.

FIG. 1 illustrates a network system configured to implement one or more aspects of the present invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 is a computing device, including a processor and memory, and executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100.

For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement any and all embodiments of the invention by operation of the network interface. An exemplary network interface is described below in conjunction with FIG. 2.

Figure 2:
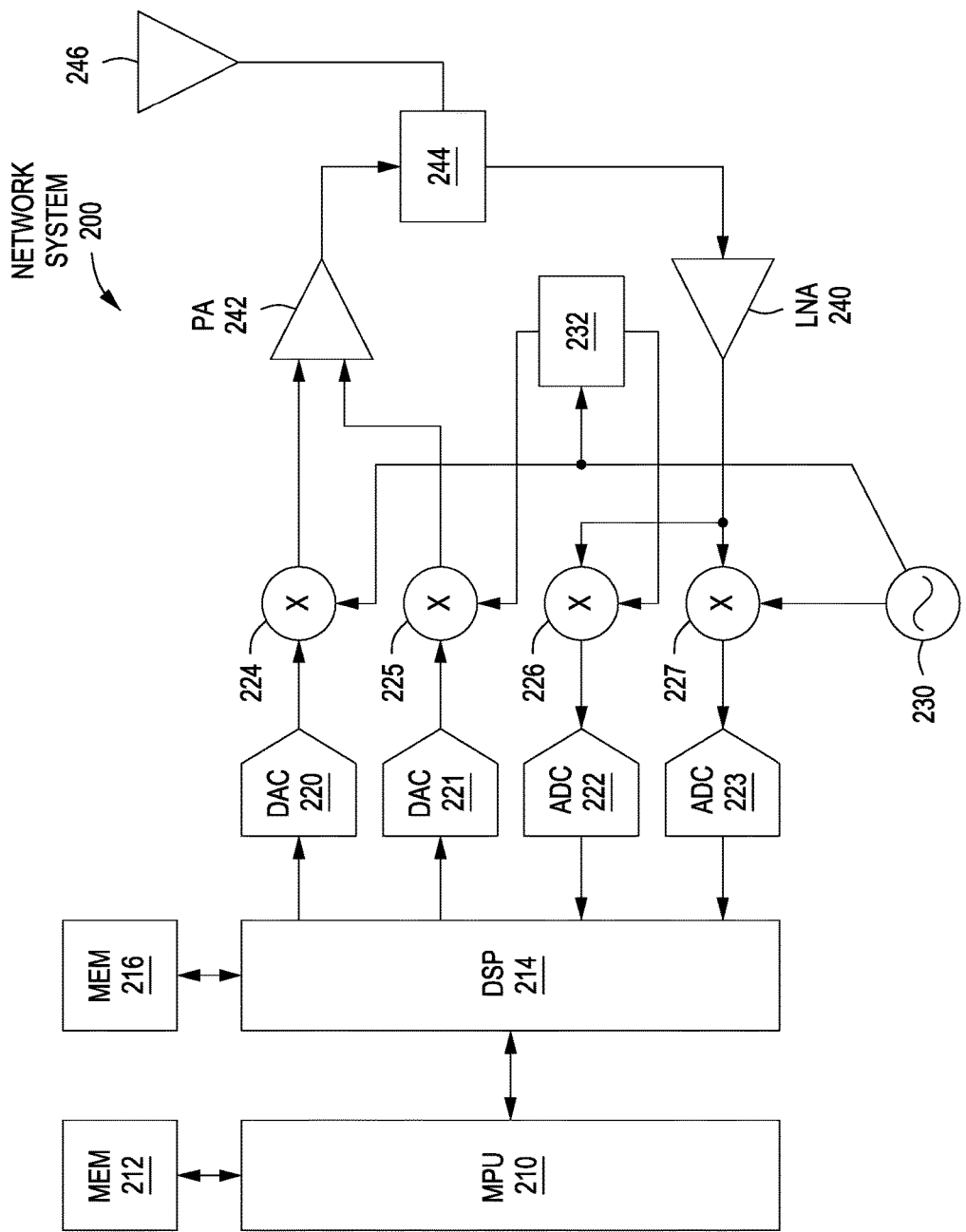
FIG. 2 illustrates a network interface configured to transmit and receive data within the wireless mesh network of FIG. 1, according to various embodiments of the present invention.

FIG. 2 illustrates a network interface configured to transmit and receive data within the mesh network of FIG. 1, according to various embodiments of the present invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. Oscillator 230 may be coupled to a clock circuit (not shown) configured to maintain an estimate of the current time. MPU 210 may be configured to update this time estimate and other data associated with that time estimate, including, for example, an uncertainty estimate associated with that time estimate.

A memory 212 may be coupled to the MPU 210 for local program and data storage. Similarly, a memory 216 may be coupled to the DSP 214 for local program and data storage. Memory 212 and/or memory 216 may be used to buffer incoming data as well as store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, MPU 210 and/or DSP 214 are configured to buffer incoming data within memory 212 and/or memory 216. The incoming data may be buffered in any technically feasible format, including, for example, raw soft bits from individual channels, demodulated bits, raw ADC samples, and so forth. MPU 210 and/or DSP 214 may buffer within memory 212 and/or memory 216 any portion of data received across the set of channels from which antenna 246 receives data, including all such data. MPU 210 and/or DSP 214 may then perform various operations with the buffered data, including demodulation operations, decoding operations, and so forth.

Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Referring generally to FIGS. 1-2, under various circumstances, nodes 130 may transmit messages to server 154 that reflect various operating conditions associated with those nodes 130. The operating conditions associated with a given node 130 could include, for example, a set of environmental conditions and/or events detected by the node 130, status information associated with the portion of the wireless mesh network 202 to which the node 130 is coupled, and status information associated with a utility grid the node 130 is configured to monitor. In addition, nodes 130 may transmit messages to each other according to a transmission schedule. To follow the transmission schedule, each node 130 maintains a clock that can be updated based on time beacons received from neighboring nodes. The distribution of time beacons is discussed in greater detail below in conjunction with FIGS. 3A-3D.

FIGS. 3A-3D illustrates how time beacons are propagated to successive layers of nodes within the wireless mesh network of FIG. 1, according to various embodiments of the present invention.

Figure 3A:
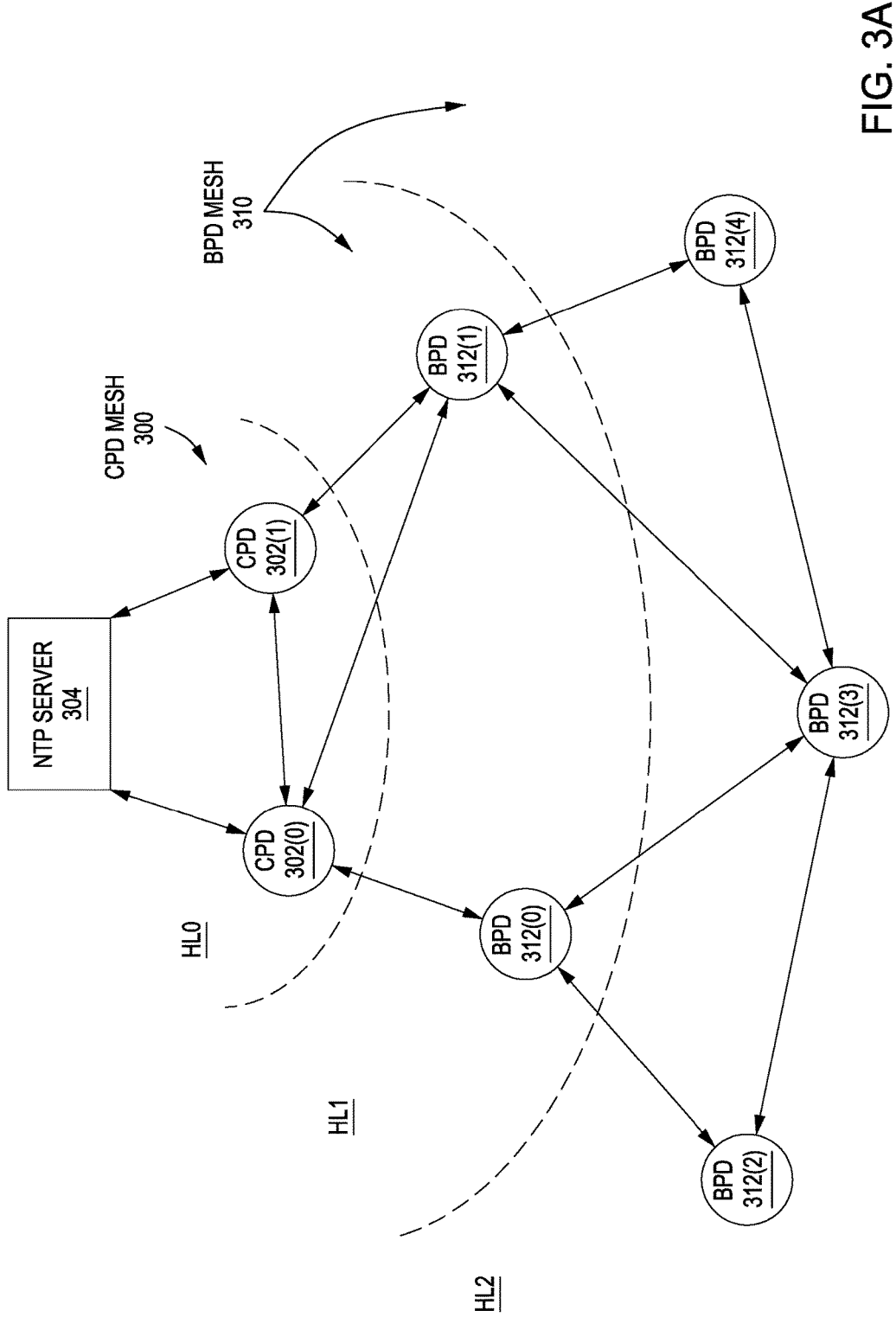
FIGS. 3A-3D illustrates how time beacons are propagated to successive layers of nodes within the wireless mesh network of FIG. 1, according to various embodiments of the present invention.

As shown in FIG. 3A, wireless mesh network 102 of FIG. 3A is divided into a continuously-powered device (CPD) mesh 300 and a battery-powered device (BPD) mesh 310. CPD mesh 300 includes CPDs 302(0) and 302(1) as well as a network time protocol (NTP) server 304. CPDs 300 may include one or more nodes 130 and/or APs 150 of FIG. 1. BPD mesh 310 includes BPDs 312(0) through 312(4). BPDs 312 may include one or more nodes 130 of FIG. 1. As a general matter, data that is transmitted from CPD mesh 300 to BPD mesh 310 is referred to herein as "outbound" data and may be described as traveling in an "outbound" or "downlink" direction. Similarly, data that is transmitted from BPD mesh 310 towards CPD mesh 300 is referred to herein as "inbound" data and may be described as traveling in an "inbound" or "uplink" direction.

BPDs 312 of BPD mesh 310 are included in different "hop layers" based on hopping distance to CPD mesh 300. BPDs 312(0) and 312(1) are included in hop layer one (HL1) because those nodes are one hop away from CPD mesh 300. BPDs 312(2) through 312(4) are included in hop layer two (HL2) because those nodes are two hops away from CPD mesh 300. Wireless mesh network 102 is configured to propagate time beacons across CPD mesh 300 and BPD mesh 310 in a coordinated manner based on hop layer, as described in greater detail below.

Figure 3B:
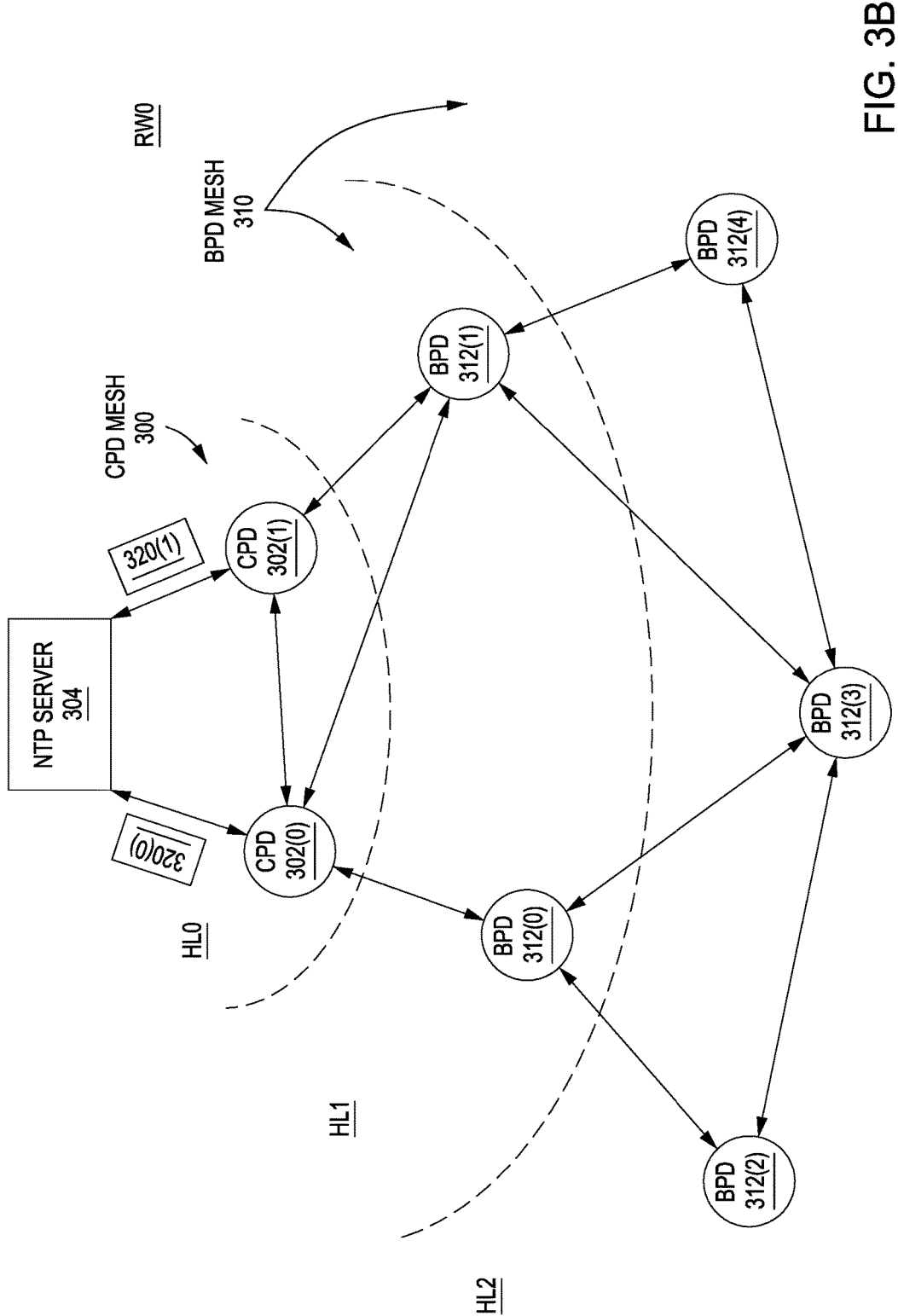

As shown in FIG. 3B, NTP server 304 is configured to transmit time beacons 320(0) and 320(1) to CPDs 302(0) and 302(1). These transmissions could occur during a receive window zero (RW0) or during any other receive window. NTP server 304 could be, for example, a National Institute of Standards and Technology (NIST) Internet time server (ITS). CPDs 302 receive these time beacons and update internal clocks. Because CPDs 302 have continuous access to power, CPDs 302 may operate in receive mode most of the time and therefore receive time beacons 320 and perform clock updates frequently. In addition, because CPDs 302 are continuously-powered, CPDs 302 may implement temperature compensated oscillators (TCXOs) or other time correction techniques in order to minimize clock drift. Thus, CPDs 302 may maintain reasonably accurate time estimates that can then be periodically transmitted into BPD mesh 310, as described below.

Figure 3C:
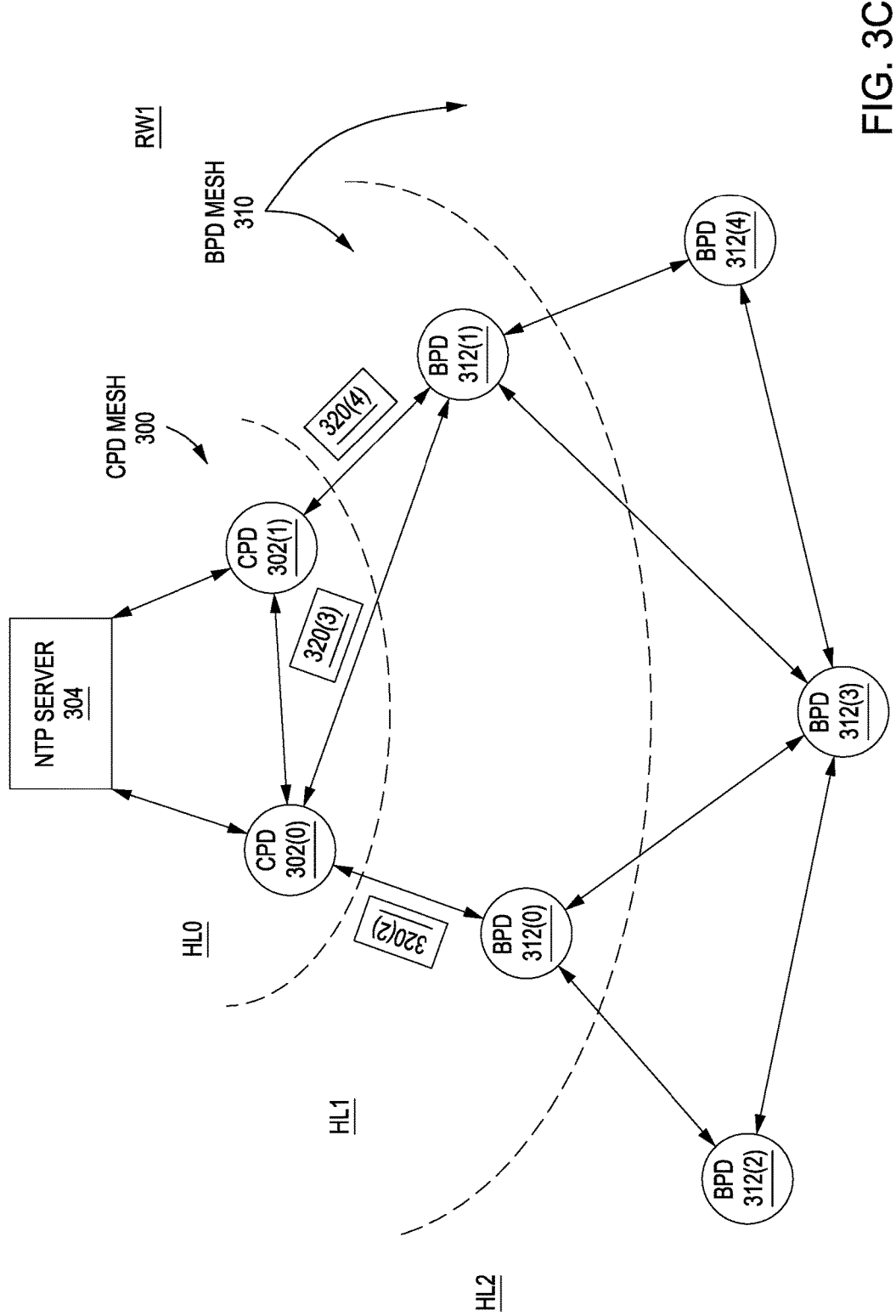

As shown in FIG. 3C, during a receive window one (RW1) associated with HL1, CPDs 302(0) and 302(1) transmit time beacons 320(2), 320(3), and 320(4) into BPD mesh 310. In particular, CPD 302(0) transmits time beacons 320(2) and 320(3) to BPDs 312(0) and 312(1), respectively, and CPD 302(1) transmits time beacon 320(4) to BPD 312(1). BPDs 312 receive these time beacons and perform a clock update using a procedure that is outside the scope of this discussion.

Figure 3D:
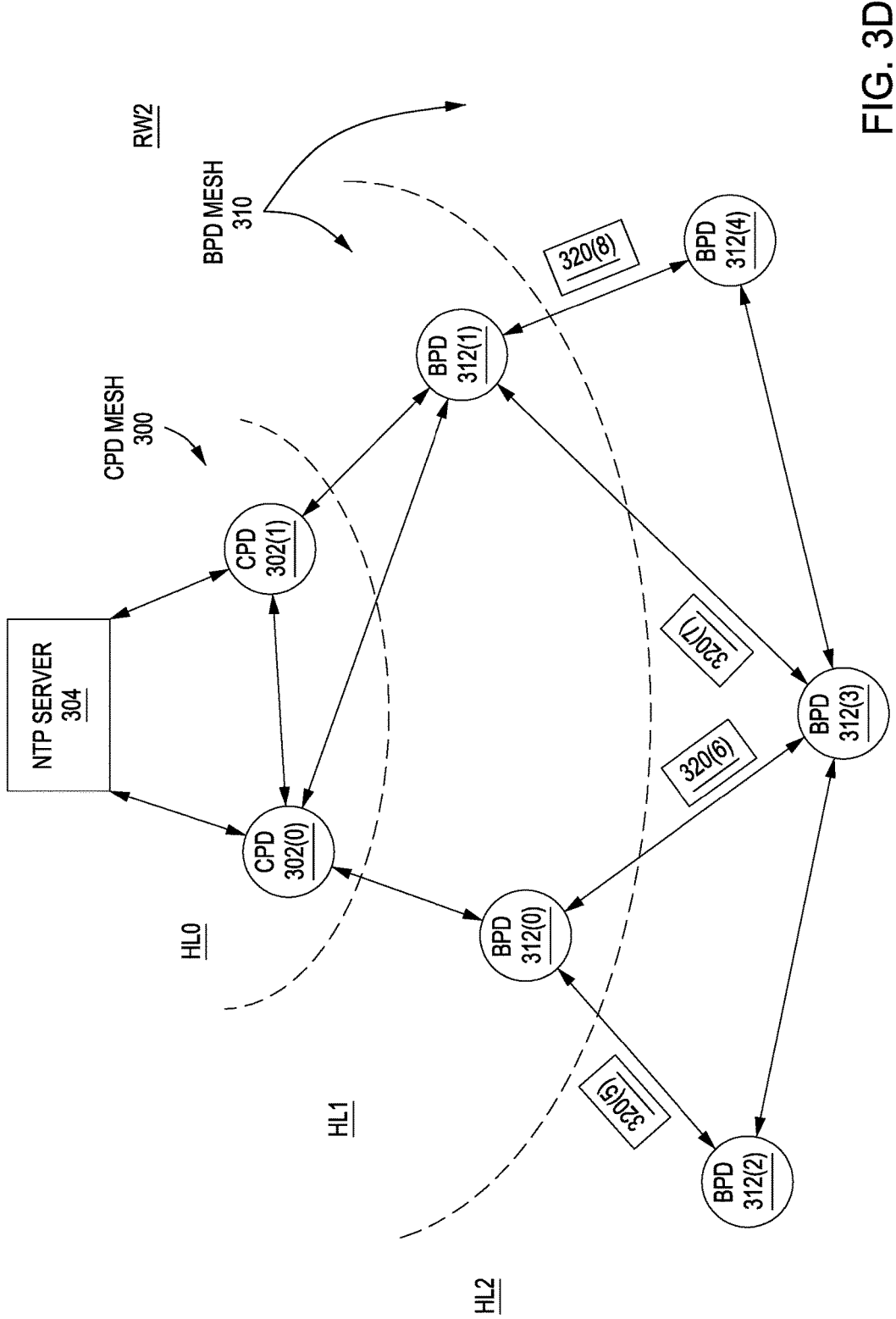

As shown in FIG. 3D, BPDs 312 then generate and transmit time beacons 320(5), 320(6), 320(7) and 320(8) during receive window two (RW2). Specifically, BPD 312(0) transmits time beacons 320(5) and 320(6) to BPDs 312(2) and 312(3) respectively, and BPD 312(1) transmits time beacons 320(7) and 320(8) to BPDs 312(3) and 312(4), respectively. BPDs 312(2), 312(3) and 312(4) may then transmit additional time beacons in an outbound direction provided wireless mesh network 102 includes additional hop layers (none shown). Each BPD 312 may also broadcast time beacons so that time beacon transmissions from a given BPD 312 to neighboring BPDs 312 occur at substantially the same time.

Referring generally to FIGS. 3A-3D, CPD mesh 300 and BPD mesh 310 interoperate in the above manner in order to distribute time beacons 320 throughout wireless mesh network 102. By transmitting time beacons 320 in the coordinated manner described above, wireless mesh network 102 can minimize the amount of time that each BPD 312 is active and receiving time beacons, thereby conserving battery life. In addition, by sourcing accurate time throughout wireless mesh network 102 as described, BPDs 312 can coordinate general data communications according to a relatively strict schedule, thereby minimizing the amount of time those BPDs 312 are actively receiving data.

Once BPDs 312 within BPD mesh 310 are synchronized in the manner described above, those BPDs 312 may then propagate data packets across the wireless mesh network by implementing a medium-latency communication mode, described below in conjunction with FIGS. 4A-5, or a low-latency communication mode, described in greater detail below in conjunction with FIGS. 6A-9.

Medium-Latency Communication Mode

Figure 4A:
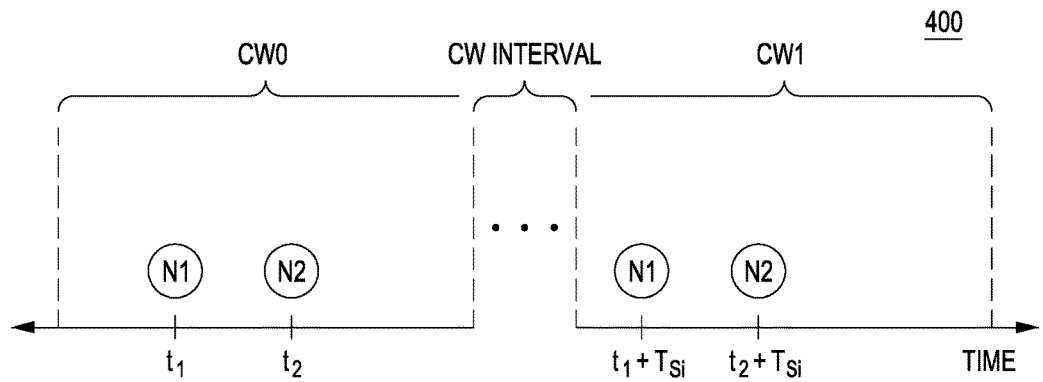
FIGS. 4A-4B illustrates a sequence of communication windows during which nodes within the wireless mesh network of FIG. 1 transmit and receive data packets, according to various embodiments of the present invention.
Figure 4B:
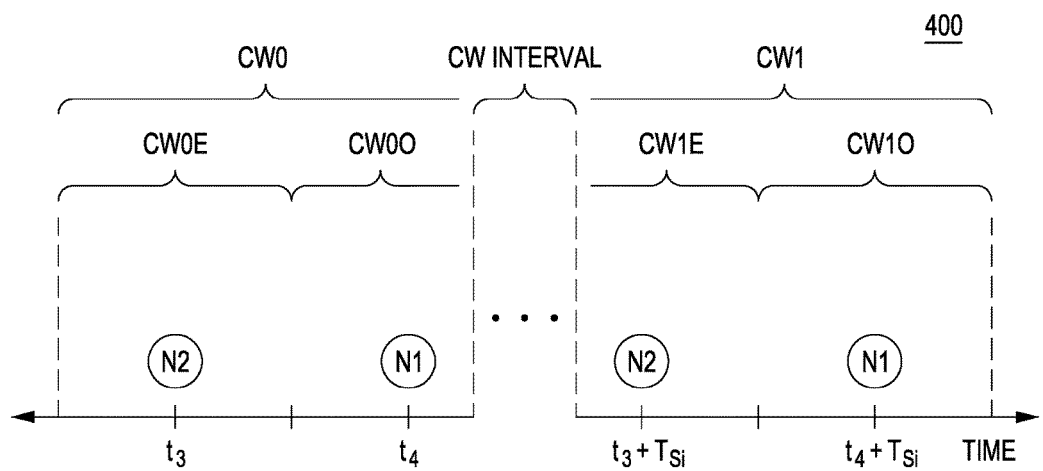

FIGS. 4A-4B illustrate a sequence of communication windows during which nodes included within the wireless mesh network of FIG. 1 transmit and receive data packets, according to various embodiments of the present invention. FIG. 4A illustrates a conventional configuration whereby various nodes are scheduled to receive data at random intervals within sequential communication windows. By contrast, FIG. 4B illustrates a medium-latency configuration whereby nodes are scheduled to receive data based on hop layer parity, as described in greater detail below. The nodes discussed herein may be BPDs 312 shown in FIGS. 3A-3D or another type of node within wireless mesh network 102.

As shown in FIG. 4A, nodes N1 and N2 become active to receive data at times t1 and t2, respectively, during communication window zero (CW0), and then power down shortly thereafter. Nodes N1 and N2 may randomly select times t1 and t2 during an initialization process. Nodes N1 and N2 also become active at times t1+Tsi and t2+Tsi, respectively, during communication window one (CW1), and then power down shortly thereafter. Tsi is a "sleep interval" that represents an amount of time that nodes N1 and N2 may be powered down. Tsi is generally based on a communication window (CW) interval. CW interval is an amount of time between communication windows when nodes are powered down. As a general matter, nodes N1 and N2 become active at periodic intervals in order to receive data from neighboring nodes, and then power down during other times, including during CW interval.

In some situations the configuration of receive times t1 and t2 may introduce unnecessary latency into wireless mesh network 102. In such situations, nodes may stall propagation of a data packet for an entire sleep interval Tsi. In particular, suppose that node N2 receives a data packet at time t2 that should be relayed to node N1. Because time t2 occurs after time t1, node N1 has just recently powered down when node N2 receives the data packet and therefore cannot receive that data packet from node N2. Consequently, node N2 is required to wait until the subsequent communication window, CW1, in order to relay the data packet to node N1 at time t1+Tsi.

The configuration described above is especially problematic when applied to networks organized based on hop layer, such as wireless mesh network 102 described in conjunction with FIGS. 3A-3D. Again, wireless mesh network 102 is organized into layers based on hop count, and may propagate data across hop layers during successive communication windows. However, a given data packet may become stalled within a particular hop layer and unable to propagate to the subsequent hop layer due to the issue described above. Consequently, when the wireless mesh network 102 operates in downlink mode to distribute data to nodes in the network, the throughput with which that data can be distributed may be reduced. Likewise, when the wireless mesh network 102 operates in uplink mode to collect data from nodes in the network, the throughput with which that data can be collected may be reduced. FIG. 4B illustrates an approach to addressing this issue.

As shown in FIG. 4B, node N2 is constrained to receive data at time t3 within the first half of CW0 and time t3+Tsi within the first half of CW1. Node N1 is constrained to receive data at time t4 within the second half of CW0 and at time t4+Tsi within the second half of CW1. Server 154, or another network management entity (NME), may configure nodes N1 and N2 to select times t3 and t4 based on the parity of the hop layer where the nodes reside. For example, if node N2 resides in an even-numbered hop layer, such as HL2 shown in FIGS. 3A-3D, then server 154 would configure node N2 to randomly select time t3 within CW0 "even" (CW0E). Similarly, if node N1 resides in an odd-numbered hop layer, such as HL1 shown in FIGS. 3A-3D, then server 154 would configure node N1 to randomly select time t3 within CW0 "odd" (CW0O).

In some configurations the ordering of CW segments CW0E and CW0O may be exchanged. For example, nodes of wireless mesh network 102 could be configured such that nodes within odd-parity hop layers receive during the first half of communication windows, whereas nodes within even-parity hop layers receive during the second half of communication windows. In one embodiment, server 154 determines that any particular segment of a communication window is designated for odd-parity or even-parity hop layers based on whether the wireless mesh network is configured to operate in uplink mode or downlink mode.

With this configuration, node N2 may receive a data packet at time t3 and then shortly thereafter be able to transmit the data packet onwards to node N1 at time t4. Accordingly, nodes N1 and N2 can propagate a data packet across an entire hop layer of wireless mesh network 102 within a single communication window, as opposed to requiring two communication windows as discussed above in conjunction with FIG. 4A. This approach may increase throughput and reduce latency, especially when the wireless mesh network 102 operates in "uplink" or "downlink" mode and propagates data packets across many hop layers.

Figure 5:
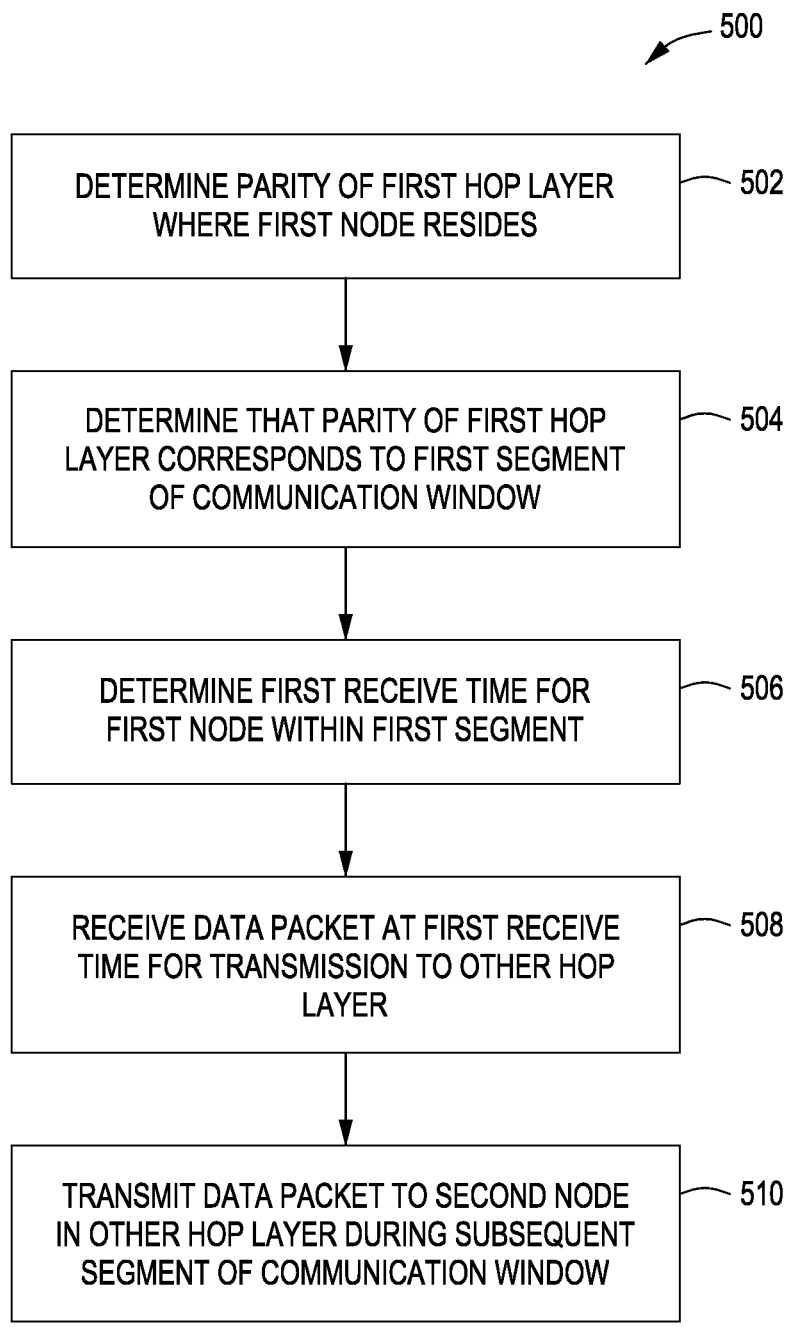
FIG. 5 is a flow diagram of method steps for propagating a data packet across a wireless mesh network that is operating in a medium-latency communication mode, according to various embodiments of the present invention.

FIG. 5 is a flow diagram of method steps for propagating a data packet across a wireless mesh network that is operating in a medium-latency communication mode, according to various embodiments of the present invention. Although the method steps are described in conjunction with the systems of FIGS. 1-4B, persons skilled in the art will understand that any system configured to perform the method steps, in any order, is within the scope of the present invention.

As shown, a method 500 begins at step 502, where server 154 determines the parity of the hop layer where a first node resides. The first node may be either of nodes N1 or N2 shown in FIGS. 4A-4B or, more generally, any BPD 312 shown in FIGS. 4A-4D. At step 504, server 154 determines that the parity of the first hop layer corresponds to a first segment of a communication window. The first segment of the communication window could be, for example, CW0O or CW0E shown in FIG. 4B.

At step 506, server 154 causes the first node to select a time within the first segment of the communication window. In one embodiment, server 154 causes the first node to select a random time within the first segment. At step 508, the first node receives a data packet at the first time for transmission to another hop layer. The other hop layer could be, for example, an adjacent uplink hop layer or an adjacent downlink hop layer. At step 510, the first node transmits the data packet to a second node that resides in the other hop layer during a subsequent segment of the communication window.

Server 154 or another NME may implement the method 500 to configure BPDs 312 in adjacent hop layers to propagate data packets across an entire hop layer within at most one communication window. This approach generally reduces the latency with which a packet can traverse wireless mesh network 102. However, server 154 may implement another approach to reduce latency even further, as described in greater detail below in conjunction with FIG. 5.

Low-Latency Communication Mode

Figure 6A:
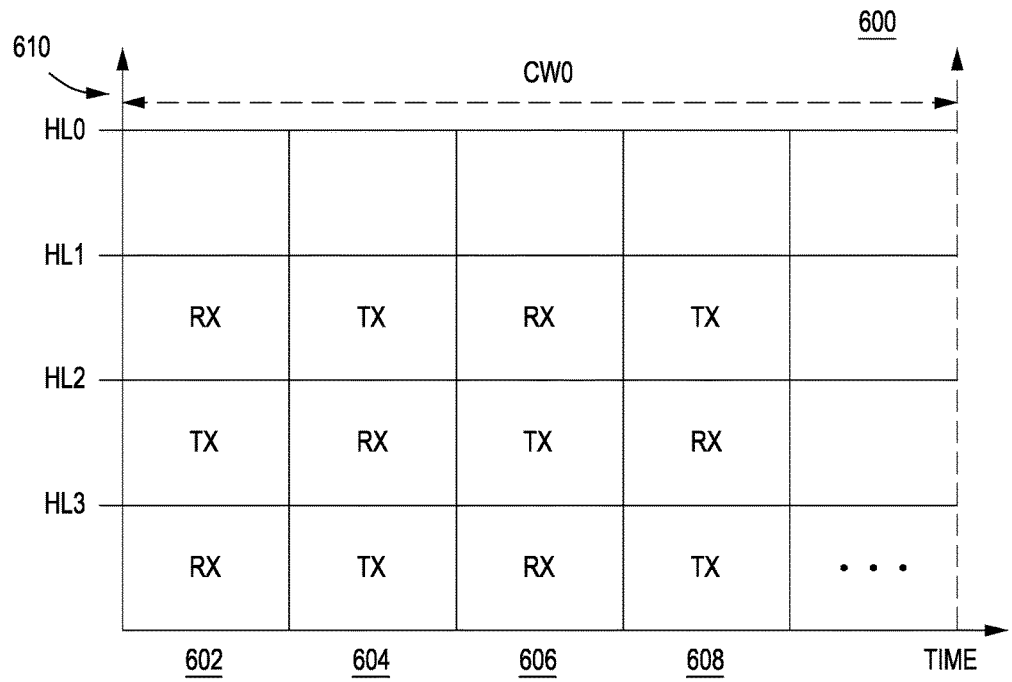
FIGS. 6A-6C illustrate interleaved transmit and receive patterns implemented by nodes within the wireless mesh network of FIG. 1 when operating in a low-latency communication mode, according to various embodiments of the present invention.
Figure 6B:
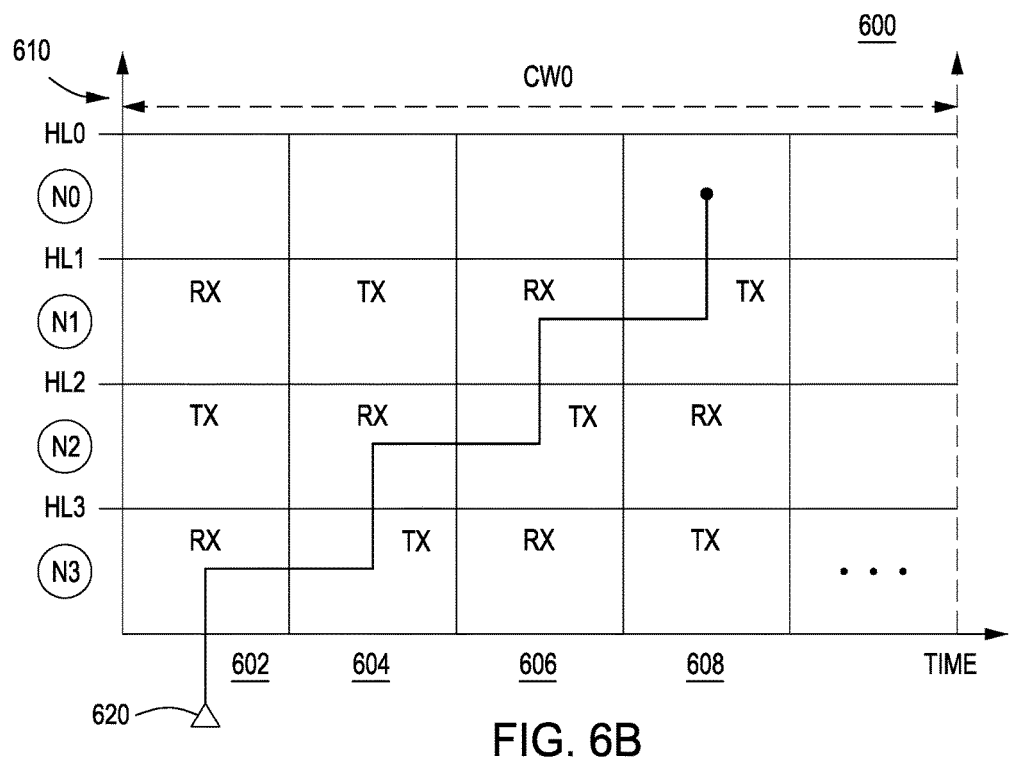
Figure 6C:
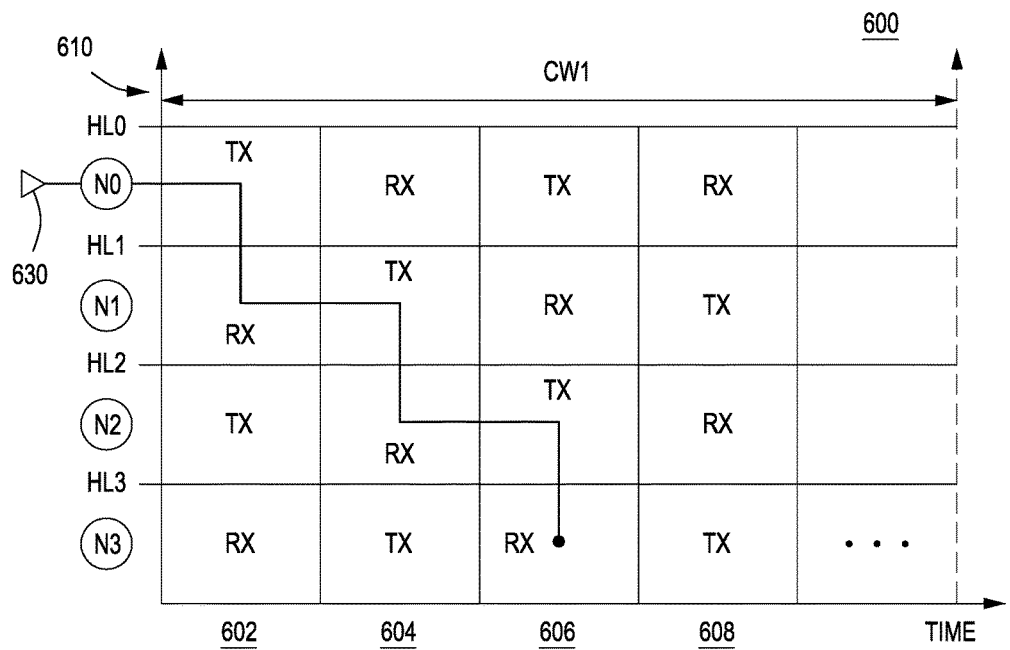

FIGS. 6A-6C illustrate interleaved transmit and receive patterns implemented by nodes included within the wireless mesh network of FIG. 1 when operating in a low-latency communication mode, according to various embodiments of the present invention. In particular, each of FIGS. 6A-6C illustrate a sequence of time slots within a given communication window when nodes that reside in different hop layers are configured to transmit or receive data to or from one another. The nodes discussed herein may be BPDs 312 shown in FIGS. 3A-3D or another type of node within wireless mesh network 102.

As shown in FIG. 6A, time axis 600 is divided into time slots 602, 604, 606, and 608, while hop layer axis 610 is divided according to hop layers HL0, HL1, HL2, and HL3. CW0 (also shown in FIGS. 4A-4B) is plotted against time axis 600 and hop layer axis 610. Each time slot 602 through 608 represents an interval of time when a node may be transmitting (TX) or receiving (RX). Whether a given node is transmitting or receiving depends on the hop layer of the node. For example, according to FIG. 6A, during time slot 602 a node within HL3 is configured to receive data. Likewise, a node within HL2 is configured to transmit data, and a node within HL1 is configured to receive data.

In like fashion, during time slot 604 a node within HL3 is configured to transmit data, a node within HL2 is configured to receive data, and a node within HL1 is configured to transmit data. During time slot 606, a node within HL3 is configured to receive data, a node within HL2 is configured to transmit data, and a node within HL1 is configured to receive data. During time slot 608, a node within HL3 is configured to transmit data, a node within HL2 is configured to receive data, and a node within HL1 is configured to transmit data. Nodes within HL0 may transmit and/or receive data during any time slot. In one embodiment, during "transmit" time slots, nodes within HL1 through HL3 may also receive data as needed.

Server 154 configures nodes in the different hop layers according to the transmit and receive patterns shown in FIG. 6A in order to implement a low-latency communication protocol. With this approach, a given data packet may traverse many hop layers of wireless mesh network 102 during a single communication window, as described by way of example below in conjunction with FIG. 6B.

FIG. 6B illustrates how wireless mesh network 102 implements the low-latency communication protocol when operating in uplink mode. As shown, a node N3 is configured to receive during time slot 602 and receives a data packet 620 during that time slot. Node N3 then shifts to transmit mode for time slot 604, and transmits data packet 620 to node N2 within HL2. Node N2 is configured to receive during time slot 604 and receives data packet 620 during that time slot. Node N2 then shifts to transmit mode for time slot 606, and transmits data packet 620 to node N1 within HL1. Node N1 is configured to receive during time slot 606, and receives data packet 620 during that time slot. Node N1 then shifts to transmit mode for time slot 608, and transmits data packet 620 to node N0 within HL0.

Generally, the interleaved pattern of transmit and receive time slots allows nodes within adjacent hop layers to coordinate communication of data packets. Because a given node in one hop layer is configured to transmit or receive when a node in another hop layer is configured to receive or transmit, respectively, a given data packet may traverse one hop layer per time slot. Thus, when wireless mesh network 102 operates in uplink mode, as is shown, wireless mesh network 102 can rapidly propagate data from the fringes of the mesh network back to HL0 where CPDs 302 reside. FIG. 6C illustrates a similar approach implemented when wireless mesh network 102 operates in downlink mode.

As shown, a node N0 receives a data packet 630 at some time prior to time slot 602. During time slot 602 node N0 transmits data packet 630 to node N1 within HL1. Node N1 is configured to receive during time slot 602 and receives data packet 630 during that time slot. Node N1 then shifts to transmit mode for time slot 604, and transmits data packet 630 to node N2 within HL2. Node N2 is configured to receive during time slot 604 and receives data packet 630 during that time slot. Node N2 then shifts to transmit mode for time slot 606, and transmits data packet 630 to node N3 within HL3. Node N3 is configured to receive during time slot 606, and receives data packet 630 during that time slot. The low-latency communication protocol can thus be implemented when wireless mesh network operates in downlink mode in order to rapidly propagate data packets from HL0 to the outer fringes of the mesh network.

Referring generally to FIGS. 6A-6C, the latency with which a given data packet traverses the entire wireless mesh network 102 depends on how many time slots are included in a given communication window and, accordingly, the width of each time slot. For example, if each time slot is sized such that only two time slots fit within a given communication window, then wireless mesh network 102 can propagate a data packet across two hop layers per communication window. Generally, when the time slots are sized such that N time slots fit within a given communication window, then wireless mesh network 102 can propagate a data packet across N hop layers per communication window. Server 154 may be configured to adjust the length of each time slot and/or the number of time slots per communication window in order to adjust the number of hops a data packet traverses within a single communication window. As mentioned above, server 154 configures the various nodes within wireless mesh network to implement the communication protocols described thus far. In addition, server 154 also configures wireless mesh network 102 for downlink or uplink mode on a per communication window basis, as described below in conjunction with FIG. 7.

Figure 7:
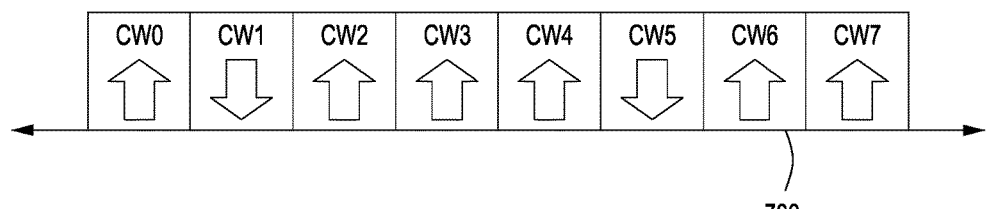
FIG. 7 illustrates a sequence of communication windows during which the wireless mesh network of FIG. 1 operates in uplink or downlink mode; according to various embodiments of the present invention.

FIG. 7 illustrates a sequence of communication windows during which the wireless mesh network of FIG. 1 operates in uplink or downlink mode, according to various embodiments of the present invention. As shown, timeline 700 includes a sequence of communication windows CW0 through CW7. Server 154 configures wireless mesh network 102 for uplink mode during CW0, downlink mode during CW1, uplink mode during CW2, CW3, and CW4, downlink mode during CW5, and uplink mode during CW6 and CW7. Server 154 may configure the nodes of wireless mesh network 102 based on the interleaved transmit/receive patterns shown in FIG. 6B when implementing CW0, CW2, CW3, CW4, CW6, and CW7. Similarly, server 154 may configure those nodes based on the interleaved transmit/receive patterns shown in FIG. 6C when implementing CW1 and CW5. Server 154 may adjust the ratio of uplink CWs to downlink CWs depending on the communication needs of wireless mesh network 102. For example, during a firmware upgrade, server 154 may implement a greater number of downlink CWs in order to rapidly distribute data packets across wireless mesh network 102. Alternatively, when performing a real-time data capture, server 154 may implement a greater number of uplink CWs compared to downlink CWs in order to capture highly granular data from the nodes of wireless mesh network 102. The various techniques discussed above are also described in stepwise fashion below in conjunction with FIGS. 8-9.

Figure 8:
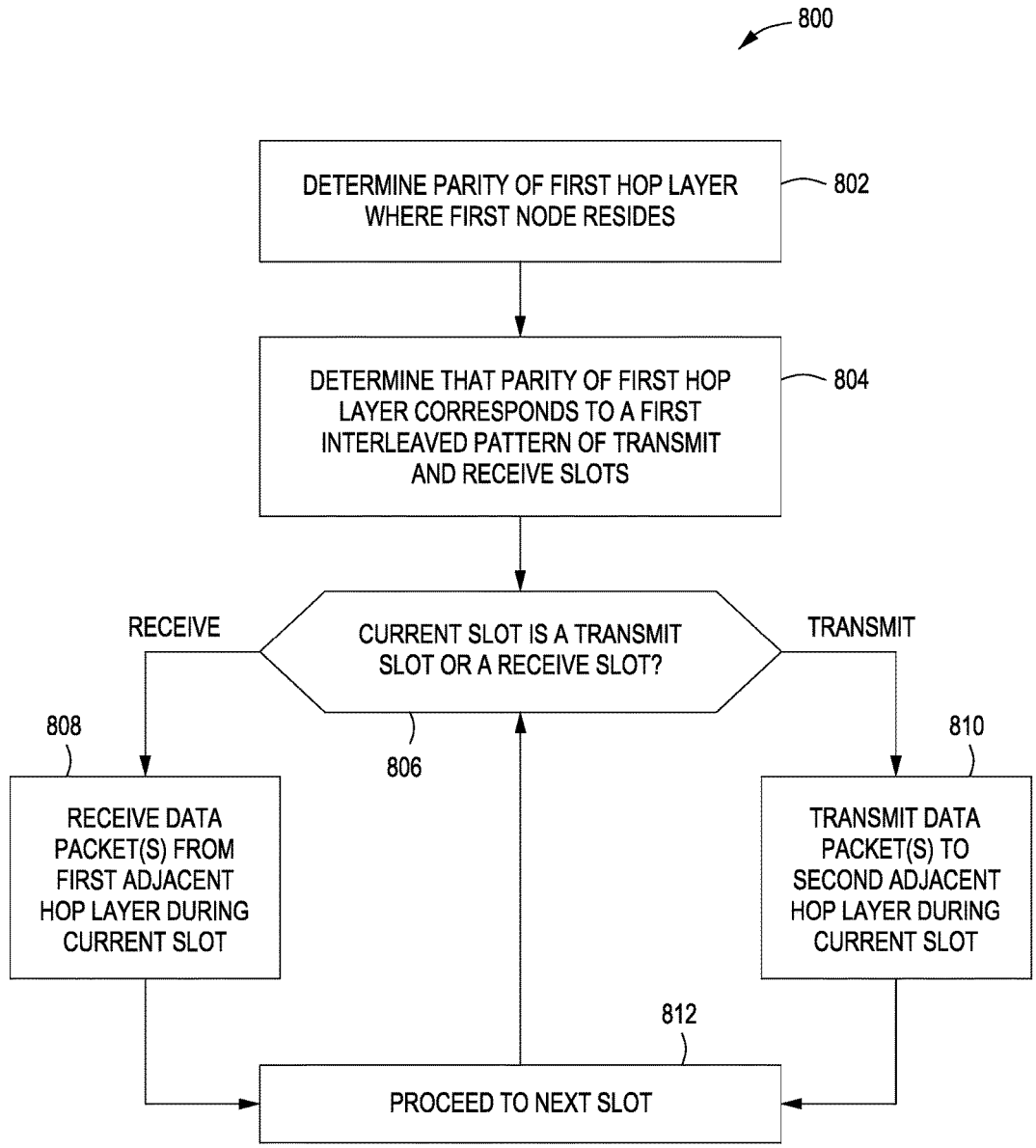
FIG. 8 is a flow diagram of method steps for propagating a data packet across a wireless mesh network that is operating in a low-latency communication mode, according to various embodiments of the present invention.

FIG. 8 is a flow diagram of method steps for propagating a data packet across a wireless mesh network that is operating in a low-latency communication mode, according to various embodiments of the present invention. Although the method steps are described in conjunction with the systems of FIGS. 1-7, persons skilled in the art will understand that any system configured to perform the method steps, in any order, is within the scope of the present invention.

As shown, a method 800 begins at step 802, where server 154 determines the parity of a first hop layer where a first node resides. For example, server 154 could determine that node N1 of FIG. 6B resides in HL1, which has odd parity. At step 804, server 154 determines that the parity of the first layer corresponds to a first interleaved pattern of transmit and receive slots. Continuing the above example, server 154 could then determine that the parity of HL1 corresponds to the pattern of receive, transmit, receive, transmit during time slots 602, 604, 606, and 608, respectively, as shown in FIG. 6B. Server 154 configures the first node according to the pattern determined at step 804.

At step 806, based on the interleaved pattern determined at step 804, the first node determines whether the current time slot is a receive slot or a transmit slot. If the first node determines at step 806 that the current time slot is a receive slot, then at step 808 the first node receives a data packet from a node within a first adjacent hop layer. If the wireless mesh network 102 is configured in downlink mode, then the first adjacent hop layer is a next higher hop layer. Alternatively, if the wireless mesh network 102 is configured in uplink mode, then the first adjacent hop layer is a next lower hop layer.

If the first node determines at step 806 that the current time slot is a transmit slot, then at step 810 the first node transmits a data packet to a node within a second adjacent hop layer. If the wireless mesh network 102 is configured in downlink mode, then the second adjacent hop layer is a next lower hop layer. Alternatively, if the wireless mesh network 102 is configured in uplink mode, then the second adjacent hop layer is a next higher hop layer. At step 812, the first node proceeds to the next time slot and then repeats step 806.

Server 154 implements the method 800 in order to configure each node within wireless mesh network 102 to perform the low-latency communication protocol. Server 154 may distribute configuration information across wireless mesh network 102 in any technically feasible manner. In addition, server 154 may instruct the nodes of wireless mesh network 102 to perform the steps of determining hop layer parity, as described in conjunction with step 802, and determining that the hop layer parity corresponds to a particular transmit/receive pattern, as described in conjunction with step 804. Server 154 also coordinates the nodes of wireless mesh network 102 for uplink or downlink communication windows, as described below in conjunction with FIG. 9.

Figure 9:
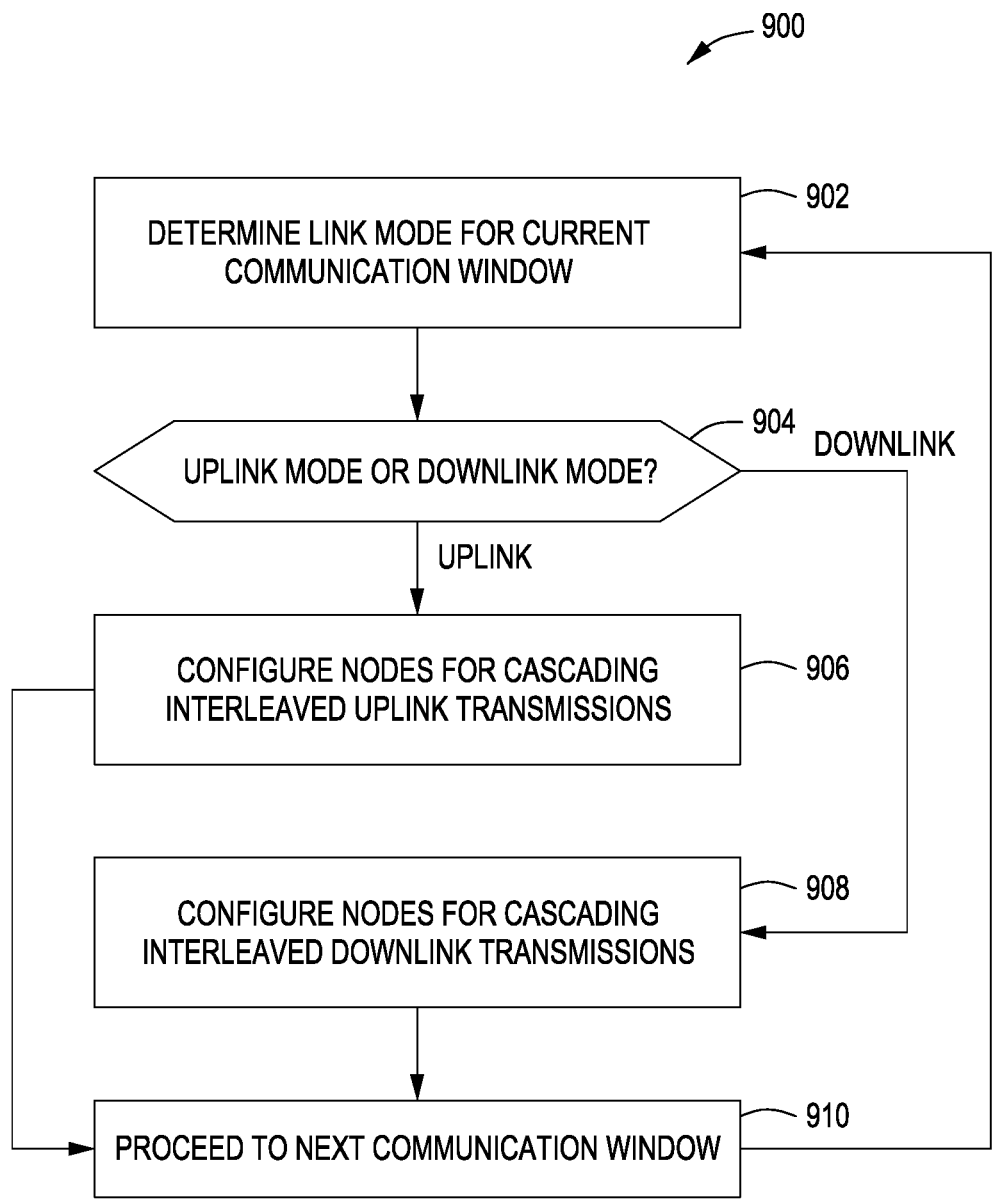
FIG. 9 is a flow diagram of method steps for configuring a wireless mesh network for uplink and downlink operating modes, according to various embodiments of the present invention.

FIG. 9 is a flow diagram of method steps for configuring a wireless mesh network for uplink and downlink operating modes, according to various embodiments of the present invention. Although the method steps are described in conjunction with the systems of FIGS. 1-8, persons skilled in the art will understand that any system configured to perform the method steps, in any order, is within the scope of the present invention.

As shown, a method 902 begins at step 902, where server 154 determines a link mode for a current communication window. Server 154 may determine the link mode based on a variety of factors, including, for example, the ratio of data that should be transmitted to nodes in the network compared to data that should be received from nodes in the network. At step 904, if the determined mode is "uplink" mode, then the method 900 proceeds to step 906 and server 154 configures nodes in the wireless mesh network according to the interleaved transmit/receive patterns shown in FIG. 6B. Alternatively, at step 904, if the determined mode is "downlink" mode, then the method 900 proceeds to step 908 and server 154 configures nodes in wireless mesh network 102 according to the interleaved transmit/receive patterns shown in FIG. 6C. In either case, the method 900 then continues to step 910 and server 154 proceeds to the next communication window. The method 900 then returns to step 902 and proceeds as described above.

Server 154 may implement the method 900 during each communication window to configure the nodes of wireless mesh network 102 according to different link modes. Alternatively, server 154 may implement the method 900 during an initialization process in order to instruct each node how to determine the appropriate link mode for any future communication window.

In sum, a wireless mesh network includes a mesh of continuously-powered devices (CPDs) and a mesh of battery-powered devices (BPDs). The BPDs are organized into hop layers based on hopping distance to the mesh of CPDs. The wireless mesh network is configured to operate in a medium-latency communication mode or a low-latency communication mode. When operating in the medium latency communication mode, a given BPD receives data during a receive window that is scheduled to occur within either the first half of a communication window or the second of the communication window, depending on the parity of the hop layer where the BPD resides. When operating in the low-latency communication mode, a given BPD receives and transmits data according to an alternating pattern that depends on the parity of the hop layer where the node resides.

At least one advantage of the techniques described herein is that when the wireless mesh network operates in the medium-latency communication mode, a data packet can traverse one hop of the BPD mesh per communication window. Alternatively, when the wireless mesh network operates in the low-latency communication mode, a data packet can traverse multiple hops of the BPD mesh within a single communication window.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for propagating data packets across a wireless mesh network, the method comprising:

configuring a first node to receive data during a first sub-interval within a first communication window, wherein the first node resides within a first hop layer of the wireless mesh network, wherein the first node is constrained to receive data during the first sub-interval;

configuring a second node to receive data during a second sub-interval within the first communication window, wherein the second node resides within a second hop layer of the wireless mesh network, wherein the second node is constrained to receive data during the second sub-interval, wherein the first sub-interval and second sub-interval comprises different sub-intervals of the first communication window; and causing the first node to receive a data packet during the first sub-interval and then transmit the data packet to the second node during the second sub-interval to propagate the data packet from the first hop layer to the second hop layer during the first communication window.

2. The computer-implemented method of claim 1, wherein nodes included in the first hop layer reside a first number of hops away from a continuously-powered device, and nodes included in the second hop layer reside a second number of hops away from the continuously-powered device, and wherein the first number of hops and the second number of hops have different parity.

3. The computer-implemented method of claim 2, wherein configuring the first node to receive data comprises:
   determining a first parity associated with the first number of hops;
   configuring the first node to receive data during the first sub-interval based on the first parity;
   determining a second parity associated with the second number of hops; and
   configuring the second node to receive data during the second sub-interval based on the second parity.

4. The computer-implemented method of claim 1, further comprising:
   configuring the first node to receive data during a third sub-interval within a second communication window,
   wherein the first node powers down for at least a portion of time between the first sub-interval and the third sub-interval.

5. The computer-implemented method of claim 4, further comprising:
   configuring the second node to receive data during a fourth sub-interval within the second communication window,
   wherein the second node powers down for at least a portion of time between the second sub-interval and the fourth sub-interval.

6. The computer-implemented method of claim 1, further comprising:
   configuring the second node to transmit during a third sub-interval within the first communication window;
   configuring a third node to receive data during the third sub-interval within the first communication window, wherein the third node resides within a third hop layer; and
   causing the second node to receive the data packet during the second sub-interval and then transmit the data packet to the third node during the third sub-interval to propagate the data packet from the second hop layer to the third hop layer during the first communication window.

7. The computer-implemented method of claim 6, further comprising:
   configuring the third node to transmit during a fourth sub-interval within the first communication window;
   configuring a fourth node to receive during the fourth sub-interval within the first communication window, wherein the fourth node resides in a fourth hop layer; and
   causing the third node to receive the data packet during the third sub-interval and then transmit the data packet to the fourth node during the fourth sub-interval to propagate the data packet across the third hop layer during the first communication window.

8. The computer-implemented method of claim 1, wherein the number of hop layers the first data packet traverses within the first communication window is equivalent to a number of sub-intervals that is included within the first communication window.

9. The computer-implemented method of claim 1, wherein the number of hop layers the first data packet traverses within the first communication window is dependent on a length of time associated with each sub-interval within the first communication window.

10. The computer-implemented method of claim 1, wherein the first node and the second node comprise battery powered devices included within a battery-powered portion of the wireless mesh network.

11. A non-transitory computer-readable medium that, when executed by a processor, causes the processor to propagate data packets across a wireless mesh network by performing the steps of:
    configuring a first node to receive data during a first sub-interval within a first communication window, wherein the first node resides within a first hop layer of the wireless mesh network, wherein the first node is constrained to receive data during the first sub-interval;
    configuring a second node to receive data during a second sub-interval within the first communication window, wherein the second node resides within a second hop layer of the wireless mesh network, wherein the second node is constrained to receive data during the second sub-interval, wherein the first sub-interval and second sub-interval comprise different sub-intervals within the first communication window; and
    causing the first node to receive a data packet during the first sub-interval and then transmit the data packet to the second node during the second sub-interval to propagate the data packet from the first hop layer to the second hop layer during the first communication window.

12. The non-transitory computer-readable medium of claim 11, wherein nodes included in the first hop layer reside a first number of hops away from a continuously-powered device, and nodes included in the second hop layer reside a second number of hops away from the continuously-powered device, and wherein the first number of hops and the second number of hops have different parity.

13. The non-transitory computer-readable medium of claim 12, wherein the step of configuring the first node to receive data comprises:
    determining a first parity associated with the first number of hops;
    configuring the first node to receive data during the first sub-interval based on the first parity;
    determining a second parity associated with the second number of hops; and
    configuring the second node to receive data during the second sub-interval based on the second parity.

14. The non-transitory computer-readable medium of claim 11, further comprising the steps of:
    configuring the first node to receive data during a third sub-interval within a second communication window,
    wherein the first node powers down for at least a portion of time between the first sub-interval and the third sub-interval.

15. The non-transitory computer-readable medium of claim 14, further comprising the steps of:
    configuring the second node to receive data during a fourth sub-interval within the second communication window,
    wherein the second node powers down for at least a portion of time between the second sub-interval and the fourth sub-interval.

16. The non-transitory computer-readable medium of claim 11, further comprising the steps of:

configuring the second node to transmit during a third sub-interval within the first communication window;

configuring a third node to receive data during the third sub-interval within the first communication window, wherein the third node resides within a third hop layer; and causing the second node to receive the data packet during the second sub-interval and then transmit the data packet to the third node during the third sub-interval to propagate the data packet from the second hop layer to the third hop layer during the first communication window.

17. The non-transitory computer-readable medium of claim 16, further comprising the steps of:

configuring the third node to transmit during a fourth sub-interval within the first communication window;

configuring a fourth node to receive during the fourth sub-interval within the first communication window, wherein the fourth node resides in a fourth hop layer; and causing the third node to receive the data packet during the third sub-interval and then transmit the data packet to the fourth node during the fourth sub-interval to propagate the data packet across the third hop layer during the first communication window.

18. The non-transitory computer-readable medium of claim 11, further comprising the step of increasing a number of sub-intervals included within the first communication window to increase a number of hop layers the first data packet traverses within the first communication window.

19. The non-transitory computer-readable medium of claim 11, further comprising the step of decreasing a length of time associated with each sub-interval included within the first communication window to increase a number of hop layers the first data packet traverses within the first communication window.

20. A system configured to propagate data packets across a wireless mesh network, comprising:

a memory storing program instructions; and a processor that, when executing the program instructions, is configured to:

configure a first node to receive data during a first sub-interval within a first communication window, wherein the first node resides within a first hop layer of the wireless mesh network, wherein the first node is constrained to receive data during the first sub-interval;

configure a second node to receive data during a second sub-interval within the first communication window, wherein the second node resides within a second hop layer of the wireless mesh network wherein the second node is constrained to receive data during the second sub-interval, wherein the first sub-interval and second sub-interval comprise different sub-intervals within the first communication window; and cause the first node to receive a data packet during the first sub-interval and then transmit the data packet to the second node during the second sub-interval to propagate the data packet from the first hop layer to the second hop layer during the first communication window.

* * * * *